(12) United States Patent
Leitheiser

(10) Patent No.: US 7,792,767 B2
(45) Date of Patent: Sep. 7, 2010

(54) MESSAGE ROUTING USING CYCLICAL NEURAL NETWORKS

(75) Inventor: Gregory Robert Leitheiser, Coppell, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 655 days.

(21) Appl. No.: 11/829,426

(22) Filed: Jul. 27, 2007

(65) Prior Publication Data

US 2009/0030860 A1    Jan. 29, 2009

(51) Int. Cl.
*G06F 15/16* (2006.01)
*G06F 15/18* (2006.01)

(52) U.S. Cl. .................. 706/20; 706/15; 709/206; 709/219; 709/246; 709/226; 709/202

(58) Field of Classification Search .................. 706/12, 706/15; 709/206, 219, 246, 226, 202
See application file for complete search history.

(56) References Cited

U.S. PATENT DOCUMENTS

| 5,166,927 | A | 11/1992 | Iida et al. |
| 5,577,028 | A | 11/1996 | Chugo et al. |
| 6,633,855 | B1 | 10/2003 | Auvenshine |
| 7,359,942 | B2 * | 4/2008 | Mizushima et al. ......... 709/206 |

* cited by examiner

*Primary Examiner*—Donald Sparks
*Assistant Examiner*—Ola Olude Afolabi
(74) *Attorney, Agent, or Firm*—Jackson Walker L.L.P.

(57) ABSTRACT

A system for routing business-to-business ("B2B") messages includes a cyclical neural network. The cyclical neural network contains neurons for determining a needed destination of a message based on content type of the message, for example. Neurons are monitored to establish a "state of understanding" of the network during processing, and tags may be applied to messages upon a determination of the needed destination.

20 Claims, 2 Drawing Sheets

MESSAGE ROUTING USING CYCLICAL NEURAL NETWORKS

BACKGROUND

1. Field of the Disclosure

This disclosure relates to electronic messaging, and more specifically, to routing electronic messages using neural network technology.

2. Description of the Related Art

Electronic messages contribute to efficiency by allowing businesses to send and receive information quickly through a communications network. Trading partners send invoices, purchase orders, and other communications using business-to-business ("B2B") messages over wide-area-networks (WANs) including, for example, the World Wide Web. Transmission costs associated with B2B messages are relatively low and B2B messages can be sent and received quickly compared to paper-based messages. Challenges exist when business partners exchange B2B messages because business partners may use different message formats or protocols to send and receive messages.

DESCRIPTION OF THE EMBODIMENT(S)

Figure 1:
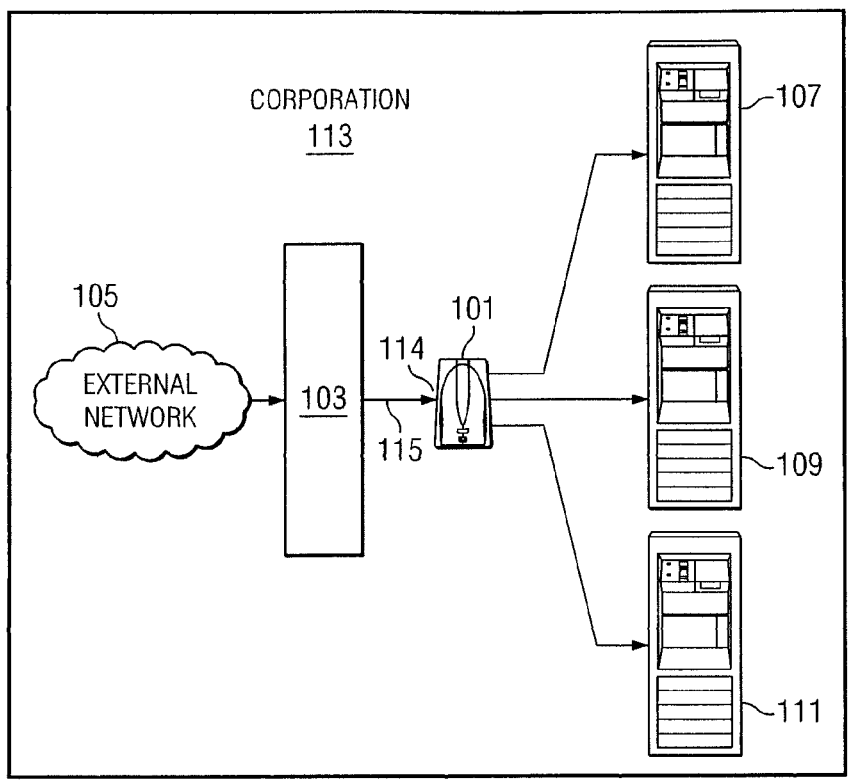
FIG. 1 depicts a communications network with an embodied routing system that receives, processes, and directs business messages to destinations within an entity.

In one aspect, a method of routing a business message is disclosed. The method includes receiving a business message that has a plurality of character strings and that inherently has an undefined content type. The message is parsed to create a first plurality of tokens. The first plurality of tokens is based on a first portion of the plurality of character strings. The plurality of tokens is fed into a cyclical neural network. The cyclical neural network includes a plurality of neurons. A first portion of the plurality of neurons is for identifying the undefined content type as a first predetermined type. A second portion of the plurality of neurons is for identifying the undefined content type as a second predetermined type. The method includes monitoring the first portion of the plurality of neurons for a first plurality of indicators that the undefined content type is the first predetermined type. The method also includes monitoring the second portion of the plurality of neurons for a second plurality of indicators that the undefined content type is the second predetermined type. The method includes tagging the business message with a first tag to define the undefined content type as the first predetermined type, in response to the first plurality of indicators indicating the undefined content type is the first predetermined type.

In another aspect, an adaptive business message router is disclosed. The adaptive business message router includes a parser for creating a plurality of tokens from a plurality of character strings. The plurality of character strings are extracted from a received business message. The adaptive business message router includes a cyclical neural network. The cyclical neural network includes at least two neurons. A first of the neurons is for identifying a first message characteristic. A second of the neurons is for identifying a second message characteristic. The adaptive business message router includes a first watcher for monitoring the first neuron for first evidence that the received business message has a first predetermined type. The adaptive business message router includes a second watcher for monitoring a second neuron for second evidence that the received business message has a second predetermined type. The adaptive business message router includes a tagger for adding a tag to the received business message.

In another embodiment, a business message router is provided. The business message router includes an input socket for receiving a plurality of business messages. The business message router further includes a parser for extracting a plurality of character strings from the plurality of business messages. The parser creates a plurality of tokens based on the extracted plurality of character strings. The business message router includes a cyclical neural network for receiving the plurality of tokens. The cyclical neural network includes a first neuron and a second neuron. The first neuron is for assessing the plurality of tokens and firing in response to accumulating a first threshold value of first indicators of a first content type. The second neuron has an output and an input. The input is influenced by the output. The second neuron is for assessing the plurality of tokens. The second neuron output is for firing in response to accumulating a second threshold value of second indicators of a second content type. The business message router further includes a first monitor coupled to the first neuron. The first monitor is for determining that a portion of the plurality of business messages is of a first type. The first type has the first characteristic and the second characteristic. The business message router further includes a tagger for adding a first tag to the first business message.

A neural network is a processing model intended to emulate the way biological nervous systems process information. Key elements of neural networks include interconnected processing elements, referred to as "neurons," working in parallel to solve specific problems. Neural networks can learn by example and can carry out a learning process to perform pattern recognition or data classification. Therefore, analogous to biological systems that learn through adjustments to connections between neurons, neural networks also learn through adjustments of parameters associated with neurons.

Neural networks learn new tasks in ways analogous to the ways humans learn new tasks. For example, if a person learns to throw a baseball to a catcher, the person first throws the baseball toward the catcher. If the catcher easily catches the baseball without the ball bouncing, the task has been performed within an internal set of tolerances. However, if the ball bounces off of the ground or goes out of the catcher's reach, the person may adjust the force and direction used in throwing the ball the next time. Similarly, if a neural network does not match a pattern within a given tolerance, it may adjust parameters for decision making and try again. Data is presented to the neural network for training, and the neural network then alters the weights associated with connections between nodes based on each training example. In many neural networks, each connection weight builds on previous decision nodes, propagating down to a final decision. Accordingly, neural networks adapt to changing inputs and learn trends from data.

Embodied routing systems as depicted and described herein use a cyclical neural network to asynchronously determine the appropriate routing for an incoming B2B message. Upon receipt at the routing system, the incoming B2B message may be of unknown composition or inherently have an undefined content type. The routing system leverages a neural network with cyclical connections to maintain a state of "understanding" about the message as the message is "read" into the network. Once this understanding reaches a critical point, for example by one or more thresholds being reached, a set of external monitors can determine the status of the network to determine at least one destination for routing the message.

Upon receipt of a message, embodiments use a parser to deconstruct the beginning of the message. The parser generates resultant strings, and the resultant strings are fed into the cyclical neural network. In addition, the parser breaks apart strings and punctuation to create a series of tokens. These tokens are fed into the network sequentially, to provide an "experience" to the network. Feeding the tokens into the network sequentially is analogous to a human mind reading a document, in the sense that both the human mind and the cyclical neural network utilize neurons to process the incoming data. Looped structures in the network provide a memory to the network between token inputs.

As a system "reads" the message, the neural network processes the content fed into it. The activation status and patterns of the neurons within the neural network constitute a form of understanding. The network is structured to determine the type of the message. Both the format type (for example, XML, MIME, EDI, etc.) and the content type (for example, purchase order, invoice, etc.) may be determined. The type of message and the content of the message are read by a series of external systems, referred to as "monitors" or "watchers," that monitor for telltale states and sequences in the neural network. In some embodiments, each watcher is constructed to recognize one format or content type. Once an appropriate activity pattern is recognized, a tagger attaches a tag to the incoming document with this information. Tagging can occur by adding metadata containing, for example, a message's type, content, or required destination. Once the appropriate tags are associated with the message, the message is sent to the appropriate processing software for routing. Accordingly, embodiments use cyclical neural networks to decipher and make processing decisions on B2B messages at runtime, in contrast to many current systems that leverage pre-configured data to make these decisions.

The embodied systems described herein employ cyclical neural networks that may be implemented in software systems, such as in software programs stored on a machine-readable medium. In many cases, neural networks are directionally layered, meaning that each layer of neurons in the network can take as inputs outputs from only those neurons in earlier layers. In contrast to these layered neural networks, cyclical neural networks are not necessarily directionally layered. Instead, cyclical neural networks may have a neuron with an output that provides an input to a neuron in an earlier layer so that the output is one of a group of inputs that trigger the neuron.

Accordingly, disclosed systems receive messages with undefined content types, for example B2B messages with arbitrary formats, protocols or content types. Disclosed systems then inspect each message's contents to determine the format and content type of the messages. The format and content type of the messages are determined by cyclical neural networks. Embodiments provide a break in the linkage between the communication channel and the routing decisions, thereby increasing the resilience of a communications network. Embodiments also reduce difficulties often encountered when adding new trading partners into a B2B messaging scheme. For example, some embodiments only use one input socket for receiving messages within a communications network. When adding a partner to a communications network, this simplifies things for both the new trading partner and the administrators of the existing communication network, because it is easy to tell the new trading partner where to send information. Using one input socket for messages also simplifies maintenance. Many rule-based routing systems require constant upkeep to ensure the rules are current. Another aspect of disclosed routing systems is that they are relatively easy to upgrade. Communication networks using disclosed systems can be configured so that adding new formats and document types is largely a matter of adding neurons and watchers to the network. Embodiments also allow enabling a wider array of capabilities without significant overhead.

FIG. 1 depicts an environment for operation of an embodied router 101. As shown, a corporation 113 is connected to an external network 105 for receiving B2B messages. External network 105 could be, for example, the Internet, a wide area network ("WAN"), a value added network ("VAN"), or another collection of data processing systems used for sending business messages between trading partners. Authorized messages sent from external network 105 go through a firewall 103, over a data path 115, and arrive at router 101. As shown, data path 115 is coupled to an input socket 114 within router 101. Input socket 114 could be an Applicability Statement 2 ("AS2") input socket configured to receive messages having various formats, types, or protocols. For example, input socket 114 may receive Electronic Data Interchange ("EDI") messages, or any other message type. In some embodiments, input socket 114 is capable of receiving messages that use digital certificates, encryption, or that have an electronic envelope.

When router 101 receives an incoming message on input socket 114, the message may be directed based on its content type, which may be undefined prior to processing by router 101. Router 101 employs cyclical neural networks to determine the content type of an incoming message that is then used to determine the proper routing for the received message. For example, if router 101 determines an incoming message is an invoice, router 101 may direct the incoming message to an accounting department 107. Similarly, if router 101 determines the incoming message is a purchase order, router 101 may direct the incoming message to a sales department 109. Rather than only sending a message to one location, router 101 may determine that an incoming message warrants sending to multiple locations. Accordingly, an incoming purchase order may be directed to a sales department 109 and also to a warehouse 111. In some embodiments, router 101 is an adaptive business router that receives incoming messages over external network 105 and, after using adaptive cyclical neural networks to characterize the incoming message, directs the messages to the appropriate departments within corporation 113.

Accordingly, business messages received by router 101 are directed to one or more appropriate departments within an organization based on content type. Router 101 determines the content type of the messages in part, by parsing the message. During the parsing step, a plurality of character strings is extracted from the business message to create a plurality of tokens. The tokens are then fed into a cyclical neural network. The cyclical neural network includes a plurality of neurons, with a first neuron portion for identifying a message's content type as a first predetermined type. For example, the first neuron portion may identify the content type of a message as an invoice. The plurality of neurons also includes a second neuron portion for identifying the message's content type as a second predetermined type. For example, the second predetermined type may be a purchase order. Upon a determination that a message has a particular content type, the message is tagged, for example with metadata, to identify the message type. In this way, router 101 has one or more neural networks enabled to identify an incoming message's undefined content type. Upon identification of the undefined content type, the message is tagged or otherwise labeled to associate it with a first predetermined type or a second predetermined type.

Router 101 may determine that a particular business message requires routing to a second entity within an organization. In some embodiments, a cyclical neural network within router 101 is fed a second plurality of tokens. As a step in router 101 processing the tokens to determine a needed destination or destinations of the business message, "watchers" within router 101 monitor a plurality of neurons within the cyclical neural network for indicators that the message has a third predetermined content type. If watchers within router 101 process the second plurality of tokens to determine that a message has a third predetermined content type, router 101 tags the business message with a second tag. The second tag indicates a second needed destination for the business message. In this way, router 101 may employ a cyclical neural network having neurons and watchers that operate independently on behalf of separate sub-entities within an organization to ensure that a business message is routed to all appropriate sub-entities.

In some embodiments, upon parsing the message to create a plurality of tokens and feeding the tokens into the cyclical neural network, the depicted embodiment of router 101 watches (i.e., monitors) the first portion of neurons for at least two indicators that the content type of the message has a first predetermined type. Router 101, as shown, also watches the second portion of neurons for at least two indicators that the message content type is the second predetermined type. Upon router 101 determining which of a plurality of predetermined types applies to the business message, router 101 applies one or more tags to the business message. The tags indicate the content type or types of the business message, and may be applied to metadata associated with the business message, for example.

In addition to determining whether an incoming message is of a pre-determined type, router 101 may also verify that a business message is from an approved sender. For example in some embodiments, in combination with parsing the message to create a plurality of tokens, router 101 compares parsed text to see if authentication characters are present to verify the identity of the sender of the message. Further, in some embodiments, router 101 is adapted to determine whether a message is encrypted. For example, upon parsing character strings from a business message and comparing the character strings to a known data set, router 101 may identify the business message as encrypted if the parsed character strings do not match any of the known data set. If router 101 determines a received message requires decryption, the message may be sent to a de-encryptor or otherwise appropriately tagged.

Figure 2:
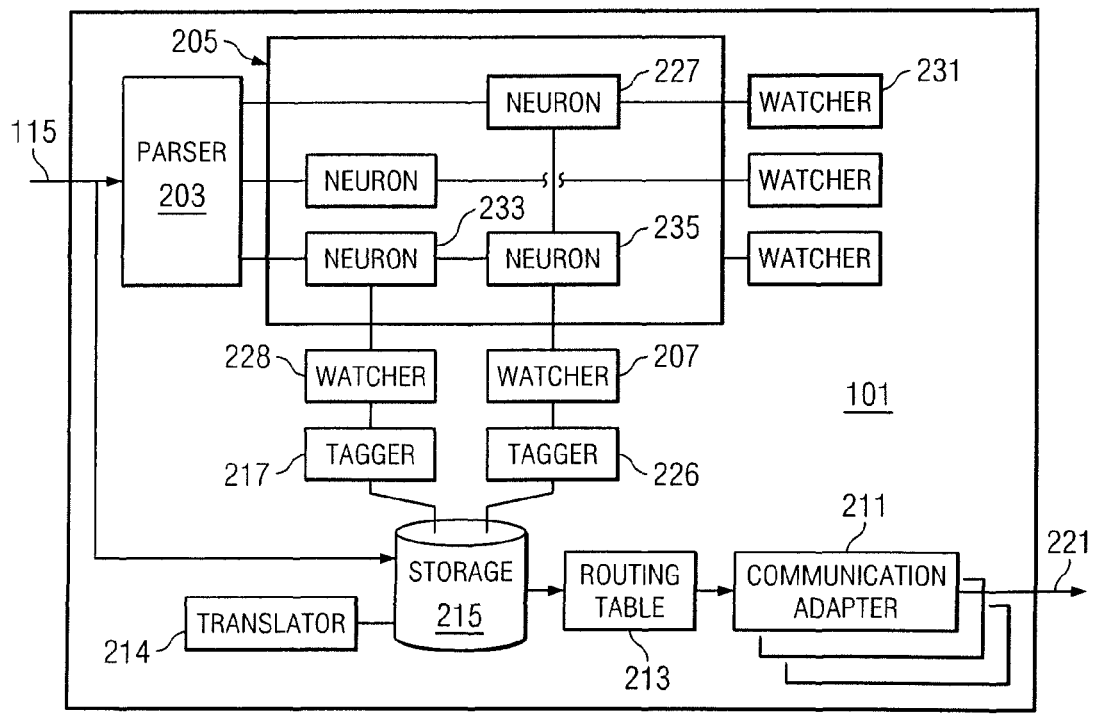
FIG. 2 illustrates aspects of the embodied routing system from FIG. 1, including a cyclical neural network having a plurality of neurons.

FIG. 2 depicts a more detailed view of router 101 from FIG. 1. Router 101, as shown, receives incoming messages over data path 115. Upon receipt of an incoming message, a document storage device 215 is used for storing the incoming message. In addition, the incoming message is sent to a parser 203. Parser 203 extracts a plurality of character strings from the incoming message. In some embodiments, parser 203 creates a plurality of tokens that are based on a first portion of the plurality of character strings extracted from the incoming message. The plurality of tokens is passed to a cyclical neural network 205. Storage 215 is in communication with a translator 214, which is used for de-encryption of messages in the event router 101 is unable to recognize parsed character strings from a received message after access to a known data set. If de-encryption of the message results in an error or in case of another error, a message may be routed through communication adapter 221 to an administrator for manual routing.

Cyclical neural network 205 includes a plurality of neurons. As shown, the plurality of neurons includes a first portion of neurons 227, which is for identifying a first predetermined message type. The plurality of neurons also includes a second portion of neurons 233, which is for identifying a second predetermined message type. A first watcher 231 monitors the first portion of neurons 227 for first evidence that the incoming business message is of a first predetermined type. For example, a first predetermined type might be an invoice. An incoming invoice might contain the word "invoice" in a character string parsed from the message. Alternatively, an invoice might contain other features of an invoice, such as a list of numbers and the text "payable on receipt" or "payable in 30 days." If the first portion of neurons 227 were trained to fire upon detecting a threshold value or amount of such text strings, then first watcher 231 would detect when a received message was an invoice.

In some embodiments, during training exercises of cyclical neural network 205, the first portion of neurons 227 and first watcher 231 are trained to accomplish recognition of certain characteristics of invoices. In this way, the first portion of neurons 227 and first watcher 231 may be trained to "fire" upon receipt of a message with a first predetermined type, such as an invoice. In some embodiments, cyclical neural network 205 receives a plurality of training sets having at least two types. One portion of the training sets contains evidence of a first predetermined type. For example, the first training sets may include invoices, with the invoices including the text "invoice" and "payable," for example. Similarly, a second portion of the training sets contains evidence of a second predetermined type. For example, the second portion of the training sets may contain purchase orders. The second training set may include example purchase orders, evidenced by extracted character strings that include, for example, the text strings "purchase order," "subtotal," "shipping," or "unit price."

Still referring to FIG. 2, a second watcher 228 monitors the second portion of neurons 233 for second evidence that the incoming message is of a second predetermined type. A second predetermined type could be any message type, for example, a purchase order. Router 101 includes a tagger 217 for adding a tag to the received business message. A tag could be any identifier added to the message or otherwise associated with the message that identifies the message as having a particular predetermined type. For example, a tag could be added to a message's metadata. Accordingly, if second watcher 228 determines by monitoring the second portion of neurons 233 that the incoming message is a purchase order, tagger 217 may add a "purchase order" tag to the incoming message's metadata.

As illustrated in FIG. 2, router 101 includes several other watchers that are analogous to first watcher 231 and second watcher 228. For example, watcher 207 monitors a neuron 235, which in turn monitors the first portion of neurons 227 and the second portion of neurons 233. In an embodiment, watcher 207 is programmed to watch for evidence that an incoming message should be routed to the accounting department 107 (FIG. 1). If watcher 207 determines, by watching neuron 235, that the incoming message should be routed to the accounting department 107 (FIG. 1), a tagger 226 adds a tag to the incoming business message. In turn, the incoming message with the tag added (i.e. the tagged message) is stored in document storage device 215. From document storage device 215, the tagged message is sent, using a routing table 213, to a communication adapter 211. In turn, the communication adapter 211 sends the tagged message over a data path 221 to the appropriate destination, for example accounting department 107 (FIG. 1).

With increasing frequency, B2B messages are sent using encryption technology. The routing of encrypted messages can be challenging. Some embodiments can detect encrypted documents because, in many instances, encrypted documents have header strings that can be recognized. In the absence of header strings that can be recognized, some embodiments recognize an encrypted document as one that generates random data strings or produces erratic signals within the neural network. For example, as illustrated in FIG. 2, a watcher 230 monitors one or more neurons (not shown) to determine whether tokens generated from parsed text strings have evidence of random data or text. In the event an encrypted message is detected, the encrypted message is sent to a decryption service. Once the message is decrypted by the decryption service, the message can be returned to the neural network and reprocessed for proper routing.

Figure 3:
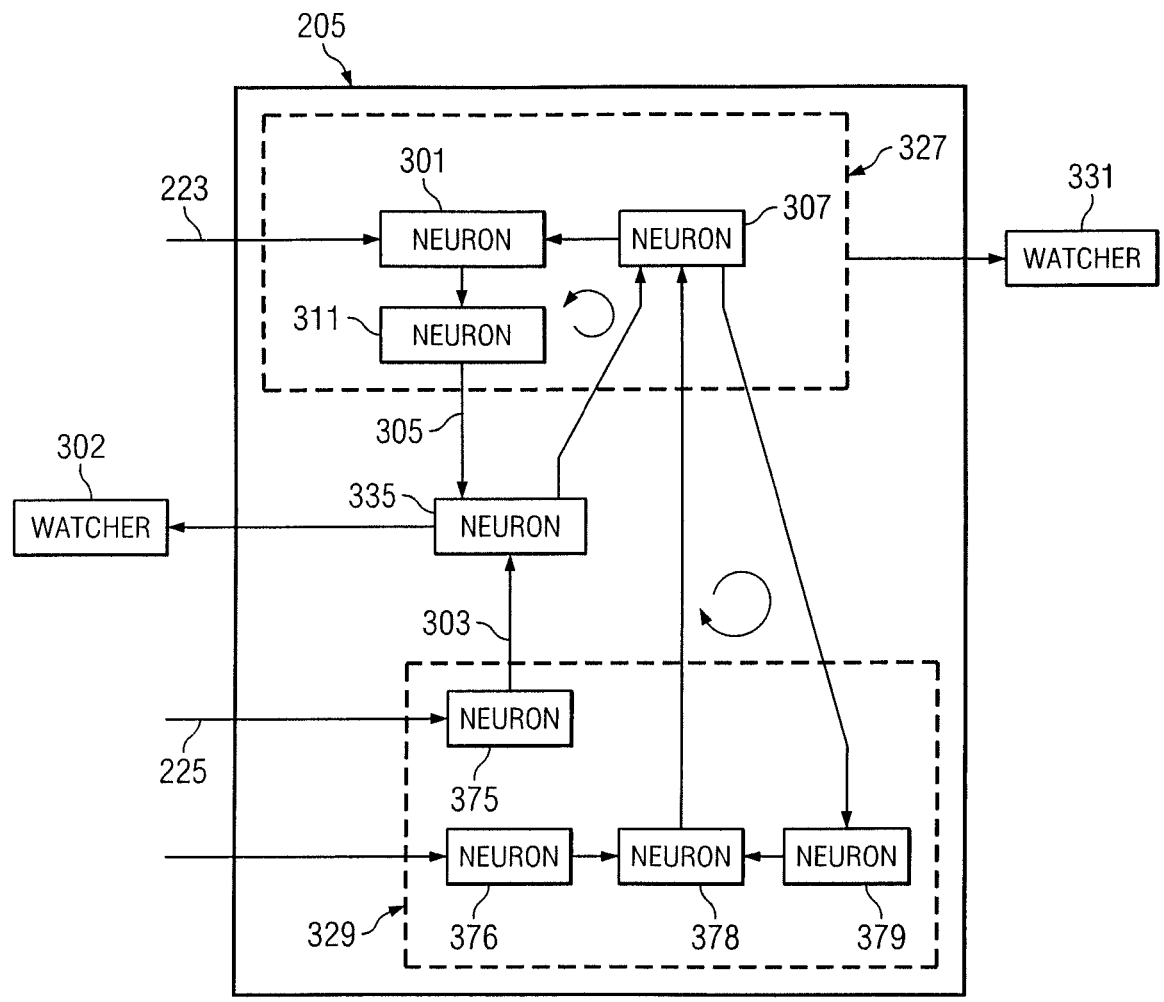
FIG. 3 illustrates aspects of a cyclical neural network including a watcher and neurons connected in a cyclical arrangement.

FIG. 3 depicts an implementation of the cyclical neural network 205 (FIG. 2). Cyclical neural network 205 includes a plurality of neurons, for example a neuron 301, a neuron 311 and a neuron 307. These neurons, as shown, compose a first neuron portion 327. First neuron portion 327 processes tokens, which are parsed from an incoming message and received over data path 223. Watcher 331 monitors first neuron portion 327 for first evidence that a received business message is of a first predetermined type. For example, watcher 331 may detect a "state of understanding" in neuron 301, neuron 311, and neuron 307 that indicates tokens received on data path 223 are from a purchase order. In this case, watcher 331 or a separate tagger (not shown), may add a tag to the business message to indicate the purchase order should be routed to sales department 107 (FIG. 1), for example.

A second neuron portion 329 processes tokens received over data path 225. Second neuron portion 329 includes a neuron 375, a neuron 376, a neuron 378, and a neuron 379. As shown, second neuron portion 329, via neuron 375, is in communication with a neuron 335. Similarly, neuron 335 is in communication with first neuron portion 327 via neuron 335. Neuron 335, as shown, is also in communication with watcher 302. Watcher 302 monitors neuron 335 for evidence that a received business message has a second predetermined type, for example that it is an accounting spreadsheet that should be routed to the accounting department 107 (FIG. 1). If accounting documents, for example spreadsheets, typically contain a large percentage of numerical characters, second neuron portion 329 and neuron 335 together may be preconfigured with training sets to have a "state of understanding" that provides watcher 302 an indication for detecting when a received message, as determined by parsed tokens, contains a large percentage of numerical characters.

Accordingly, as shown, neuron 335 and neuron portions 327 and 329 process tokens received over data path 223 and data path 225 and "fire" upon determining that an incoming business message resembles one or more predetermined types. Watcher 302 monitors neuron 335 for evidence that an incoming business message should be routed to the accounting department 107 (FIG. 1), for example. Upon watcher 302 determining that the incoming business message should be routed to the accounting department 107 (FIG. 1), watcher 302 or a separate tagger (not shown) adds an appropriate tag to the incoming message. For example, an "accounting" tag might be added to metadata associated to the incoming message.

As a further aspect of some embodiments, in the implementation of neural network 205 depicted in FIG. 3, several neurons are interconnected, interdependent, and configured in a cyclical arrangement. For example, neuron 335 receives inputs over path 303 from neuron 375, which is a component of second neuron portion 329. Neuron 335 also receives inputs over path 305 from neuron 311, which is a component of first neuron portion 327. Neuron 335 communicates an input to neuron 307, which is a portion of first neuron portion 327. Neuron 307 also receives an input from neuron 378, which is a component of neuron portion 329. In this way, neurons are interconnected and dependent upon one another. Further, in some embodiments, each neuron may build on the decisions of previous neurons. Accordingly, as shown, cyclical neural network 205 may propagate down to a "final decision."

Another aspect of the implementation of neural network 205 shown in FIG. 3 is that neurons may employ a form of feedback, contributing to neural network 205 being a "cyclical neural network." For example, neuron 335 receives feedback in the form of an input that is affected by the output of neuron 335. Specifically, neuron 335 communicates an output to neuron 307, which communicates an output to neuron 301. Neuron 301, depending in part upon tokens received over path 223 and inputs received from 307, then fires upon reaching a threshold, thereby communicating a signal to neuron 311. In turn, as shown, neuron 311 is in communication for sending a signal back over path 305 to neuron 335. Thus, as shown, cyclical neural network 205 contains a feedback loop, in which the output of neuron 335 affects the input of neuron 335. More generally, cyclical neural network 205 includes at least one neuron having an output that drives the input of at least one other neuron where the other neuron is in an earlier layer. In accordance with disclosed embodiments, such feedback loops may be used as a form of memory.

For clarity, neural network 205, as shown in implementations in FIG. 2-3, contains a relatively small number of neurons. However, in practice, a business message router 101 (FIG. 1-2) for a large enterprise could employ one or more cyclical neural networks containing thousands of neurons. In some embodiments, many of these neurons or subgroups of neurons operate substantially simultaneously and in parallel to determine proper routing for incoming business messages.

Referring to FIG. 2-3, implementations of cyclical neural network 205 may be trained to perform recognition and routing tasks using training sets made up of a variety of real-life example business messages. Through such training, embodiments of cyclical neural network 205 learn how to process incoming business messages for proper routing. Neural network 205 thereby creates connections and learns patterns based on characteristics of messages within the training set.

In addition to routing encrypted messages, other important activities related to receiving messages include record-keeping and authentication. In a traditional paper environment of business, an original signature has been viewed as the binding authorization for a business transaction to occur. In an electronic commerce environment, the exchange of electronic mail-boxing information, sender/receiver IDs, or authorization/security information may be used to represent the traditional signature. Regarding record-keeping, the receiving company of a B2B message may wish to archive the message for record-keeping purposes. Such archiving can be accomplished using document storage device 215 (FIG. 2). As a further alternative, the record-keeping may only occur for certain messages, for example for invoices over a certain amount. For example, record-keeping for invoices over $25 can be achieved using a cyclical neural network that routes all messages deemed to be an invoice for over $25 to a memory, disk, or other archive.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the claimed subject matter is to be determined by the broadest permissible interpretation of the following claims and their equivalents, and shall not be restricted or limited by the foregoing detailed description.

What is claimed is:

1. A method of routing a business message having a plurality of character strings and a message content type, the method comprising:
    parsing a first plurality of tokens from a first portion of the plurality of character strings;
    feeding the first plurality of tokens into a cyclical neural network, the cyclical neural network including a plurality of neurons, a first portion of the plurality of neurons for identifying a first predetermined content type, a second portion of the plurality of neurons for identifying a second predetermined content type;
    monitoring the first portion of the plurality of neurons for a first signal that the message content type is the first predetermined content type;
    monitoring the second portion of the plurality of neurons for a second signal that the message content type is the second predetermined content type; and
    tagging the business message with a first tag in response to the first signal.

2. The method of claim 1, further comprising:
    training the cyclical neural network by receiving a plurality of training sets, a first portion of the plurality of training sets containing a first plurality of examples of the first predetermined content type, a second portion of the plurality of training sets containing a second plurality of examples of the second predetermined content type.

3. The method of claim 2, wherein the first portion of the plurality of neurons has a first input and a first output, wherein the first input receives a signal derived at least in part from the first output.

4. The method of claim 1, wherein the cyclical neural network includes a first layer of neurons and a second layer of neurons, wherein an output of a neuron in the second layer is input to a neuron in the first layer and wherein an output of a neuron in the first layer is input to a neuron in the second layer.

5. The method of claim 1, wherein tagging the business message comprises attaching metadata to the business message.

6. The method of claim 5, further comprising receiving the business message over a single input socket operable to receive a plurality of business messages having a plurality of protocols.

7. The method of claim 1, further comprising:
    parsing a second plurality of tokens from a second portion of the plurality of character strings;
    feeding the second plurality of tokens into the cyclical neural network;
    monitoring a third portion of the plurality of neurons for a third signal that the content type is of a third predetermined type; and
    tagging the business message with a second tag, the second tag indicating a needed destination for the business message.

8. The method of claim 1, further comprising:
    comparing the first portion of the plurality of character strings to a known data set;
    identifying the business message as encrypted based on the comparing step; and
    sending the business message to a translator for de-encryption.

9. The method of claim 1, further comprising:
    storing the business message;
    accessing a routing table to determine a destination for the business message, the destination based on the first tag; and
    sending the business message to the destination.

10. An adaptive business message router, comprising:
    a parser for creating a plurality of tokens from a plurality of character strings, the plurality of character strings extracted from a received business message;
    a cyclical neural network including a first neuron for identifying a first message characteristic and a second neuron for identifying a second message characteristic;
    a first watcher for monitoring the first neuron for first evidence indicative of the first characteristic of the received business message;
    a second watcher for monitoring the second neuron for second evidence indicative of the second characteristic of the received business message; and
    a tagger for adding a first tag to the received business message responsive to the first watcher wherein the first tag is indicative of the first characteristic of the received business message.

11. The adaptive business message router of claim 10, further comprising:
    an input socket for receiving the received business message, the input socket adapted for receiving business messages sent using multiple protocols.

12. The adaptive business message router of claim 11, further comprising:
    a communications adapter for sending the received business message to a destination;
    a routing table for accessing a destination address based on the first tag; and
    a memory for storing the received business message.

13. The adaptive business message router of claim 11, wherein the first neuron and the second neuron operate substantially concurrently.

14. The adaptive business message router of claim 12, wherein the memory is in communication with the first watcher and the second watcher, wherein the memory stores the tagged business message.

15. A business message router comprising:
    an input socket for receiving a plurality of business messages;
    a parser for extracting a plurality of character strings from a first of the plurality of business messages, the parser for creating a plurality of tokens based on the extracted plurality of character strings;
    a cyclical neural network, the cyclical neural network for receiving the plurality of tokens, the cyclical neural network including:
        a first neuron for assessing the plurality of tokens and firing in response to accumulating a first threshold value of first indicators that a corresponding business message has a first content type;

a second neuron having an output and an input, the second neuron for assessing the plurality of tokens, the second neuron output for firing in response to accumulating a second threshold value of second indicators that the corresponding business message has a second content type, wherein the second neuron input is influenced by the second neuron output;

a first monitor coupled to the first neuron, the first monitor for detecting said firing of said first neuron; and a tagger for adding first tags to selected business messages based on input from the first monitor thereby resulting in tagged business messages.

16. The business message router of claim 15, wherein the first of the plurality of business messages has a metadata field, wherein the first tag is added to the metadata field.

17. The business message router of claim 15, wherein the first neuron has a first state influenced by a first training set, wherein the second neuron has a second state influenced by the first training set.

18. The business message router of claim 15, wherein the first tag includes a destination address for the corresponding tagged business message.

19. The business message router of claim 15, further comprising:

a second monitor coupled to a third neuron, the third neuron for recognizing encrypted documents.

20. The business message router of claim 19, further comprising:

a memory for storing the plurality of received business messages and the tagged business messages;

a routing table for accessing a destination of a selected tagged business message based on the first tag; and a communications adapter in communication with the routing table and memory, the communications adapter for sending the tagged business message to the destination.

* * * * *